(12) United States Patent
Jung

(10) Patent No.: US 9,457,625 B2
(45) Date of Patent: Oct. 4, 2016

(54) TIRE PRESSURE MANAGEMENT SYSTEM WITH ENHANCED WIRELESS SECURITY AND CONTROL METHOD THEREOF

(71) Applicant: Hyundai Motor Company, Seoul (KR)

(72) Inventor: Ho Jin Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/570,031

(22) Filed: Dec. 15, 2014

(65) Prior Publication Data

US 2015/0197123 A1 Jul. 16, 2015

(30) Foreign Application Priority Data

Jan. 13, 2014 (KR) .......................... 10-2014-0003851

(51) Int. Cl.
*B60C 23/04* (2006.01)

(52) U.S. Cl.
CPC ......... *B60C 23/0415* (2013.01); *B60C 23/044* (2013.01); *B60C 23/0437* (2013.01)

(58) Field of Classification Search
CPC .......... B60C 23/0415; B60C 23/0418; B60C 23/0433; B60C 23/0437; B60C 23/044; B60C 23/0447; B60C 23/0457; B60C 23/0474; B60C 23/0408; G06F 11/30
USPC ................... 340/442, 445, 447, 449, 426.33; 73/146, 146.2, 146.3; 116/34 R; 701/1, 701/34.4, 37
See application file for complete search history.

(56) References Cited

U.S. PATENT DOCUMENTS

| | | | |
|---|---|---|---|
| 7,397,348 B2 | 7/2008 | Iwazumi et al. | |
| 8,311,153 B2 * | 11/2012 | Higuchi | ................ H04L 25/061 340/442 |
| 8,332,104 B2 | 12/2012 | Greer et al. | |
| 2005/0258951 A1 * | 11/2005 | Lin | ..................... B60C 23/0416 340/447 |
| 2007/0144639 A1 | 6/2007 | Oh | |
| 2009/0102634 A1 | 4/2009 | Okada et al. | |
| 2009/0241643 A1 | 10/2009 | Leman | |
| 2011/0304454 A1 | 12/2011 | Lickfelt et al. | |

FOREIGN PATENT DOCUMENTS

| | | |
|---|---|---|
| JP | 2006-021717 A | 1/2006 |
| JP | 2006-287739 A | 10/2006 |
| JP | 2009-097272 A | 5/2009 |
| JP | 2012-028851 A | 2/2012 |
| JP | 2012-126282 A | 7/2012 |
| KR | 2011-0053320 A | 5/2011 |

* cited by examiner

*Primary Examiner* — Hung T Nguyen
(74) *Attorney, Agent, or Firm* — Mintz Levin Cohn Ferris Glovsky and Popeo, P.C.; Peter F. Corless

(57) ABSTRACT

A tire pressure management system with enhanced wireless security and a control method thereof are provided. The tire pressure management system includes initiators configured to wirelessly transmit a tire information request signal to tire pressure sensors when the initiators receive a first signal, a receiver configured to receive packets including the tire information from the tire pressure sensors, and an electronic control unit (ECU) configured to transmit the first signal to the initiators. Further the ECU is configured to measure a delay after transmission of the first signal until the packets are received. The ECU is also configured to transmit the tire information within the received packets to a cluster or drop the received packets in response to the delay.

14 Claims, 3 Drawing Sheets

TIRE PRESSURE MANAGEMENT SYSTEM WITH ENHANCED WIRELESS SECURITY AND CONTROL METHOD THEREOF

CROSS-REFERENCE(S) TO RELATED APPLICATION

This application claims the benefit to Korean Patent Application No. 10-2014-0003851, filed on Jan. 13, 2014, which is hereby incorporated by reference in its entirety.

BACKGROUND

1. Field of the Invention

The present invention relates to a vehicle tire pressure management system, and more particularly, to a tire pressure management system with enhanced wireless security and a control method thereof.

2. Discussion of the Related Art

When the air pressure of a vehicle tire is excessively overinflated or underinflated, the tire may blow or a vehicle may lose traction and cause an accident. Further, fuel consumption increases, leading to a lower fuel ratio, a shorter tire life span, and vehicle breaking force is substantially lowered. To prevent such tire defects, a safety apparatus (i.e., a tire pressure management system (TPMS)) is disposed within the vehicle. The TPMS may also be referred to as a tire air pressure automatic sensing system, a tire pressure sensing system, or a tire pressure monitoring system. Generally, the TPMS is designed to detect air pressures and temperatures of tires using radio frequency identification (RFID) sensors attached to the tires and to transmit the information to a driver to allow the driver to monitor the pressure of the tires in real time. Tire durability, braking force, and the fuel ratio can be improved by using a TPMS and also prevent severe shaking of a vehicle body while the vehicle is driven.

The development of vehicle electronic devices has enabled various controllers disposed within the vehicle to be hacked. Further, it is possible the TPMS may be vulnerable to hacking due to the wireless communication between the controller and tire sensors. According to recent research and developments, a TPMS warning light frequently turns on (i.e., in a low cycle during driving) and incorrect tire sensor information is displayed, which may distract the driver and cause a potential accident.

SUMMARY

An objective of the present invention provides a tire pressure management system with enhanced wireless security and a control method thereof. Another objective of the present invention provides a tire pressure management system and a control method thereof which may filter out incorrect tire-related information transmitted externally.

Additional advantages, objects, and features of the invention will be set forth in part in the description which follows and in part will become apparent to those having ordinary skill in the art. The objectives and other advantages of the invention may be realized and attained by the structure particularly pointed out in the written description and claims hereof as well as the appended drawings.

According to one exemplary embodiment of the present invention, a tire pressure management system may include initiators configured to wirelessly transmit a tire information request signal to tire pressure sensors when the initiators receive a first signal, a first signal controller configured to transmit the first signal to the initiators, a receiver configured to receive packets including tire information from the tire pressure sensors, a delay calculation unit configured to measure a delay after transmission of the first signal until the packets are received, and a packet processing unit configured to transmit the tire information within the received packets to a cluster or drop the received packets based on the delay.

In another exemplary embodiment of the present invention, a tire pressure management system may include initiators configured to wirelessly transmit a tire information request signal to tire pressure sensors when the initiators receive a first signal, a receiver configured to receive packets including tire information from the tire pressure sensors, and an electronic control unit (ECU) configured to transmit the first signal to the initiators, measure a delay after transmission of the first signal until the packets are received, and transmit tire information within the received packets to a cluster or drop the received packets based on the delay.

In yet another exemplary embodiment of the present invention, a method for controlling a tire pressure management system may include transmitting a first signal from an ECU to initiators, wirelessly transmitting a tire information request signal from the initiators to tire pressure sensors in response to the first signal, receiving packets including the tire information from the tire pressure sensors via a receiver, measuring a delay via the ECU after transmission of the first signal until the packets are received, and transmitting the tire information within the received packets to a cluster or dropping the received packets based the delay via the ECU.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
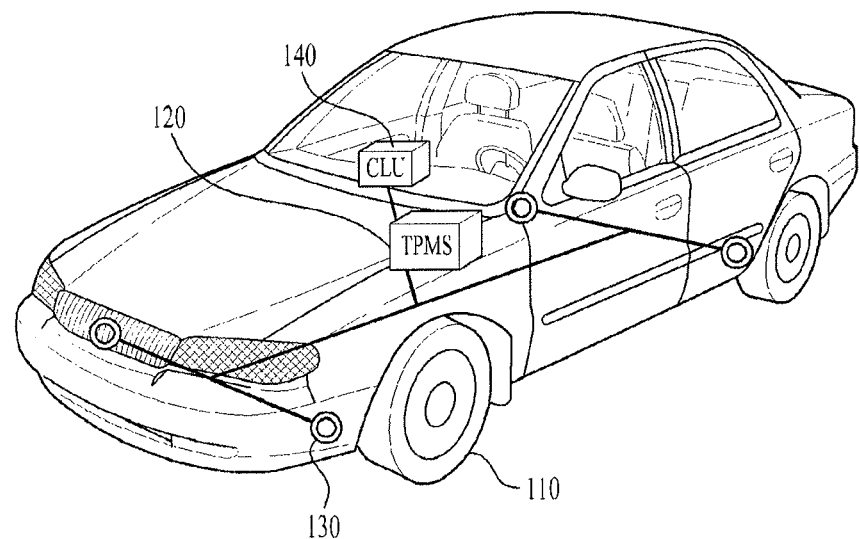
FIGS. 1A and 1B are exemplary views illustrating a tire pressure management system according to one exemplary embodiment of the present invention.
Figure 1:
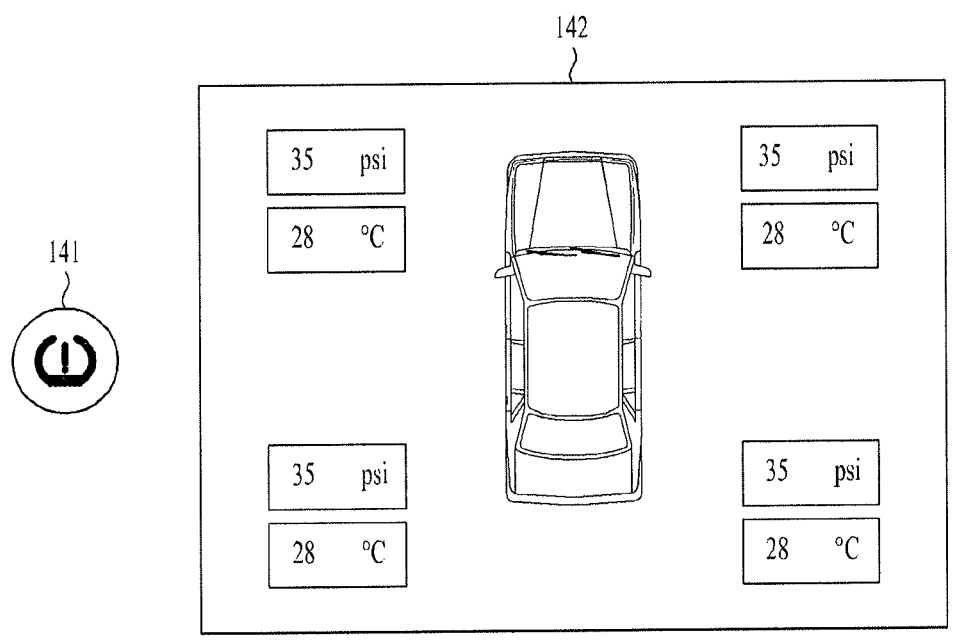

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, specific examples of which are illustrated in the accompanying drawings. The suffixes "module" and "unit" in elements used in description below are given or used together in consideration of only ease in preparation of the specification and do not have distinctive meanings or functions.

FIGS. 1A and 1B are exemplary views illustrating a tire pressure management system according to one exemplary embodiment of the present invention. With reference to FIG. 1A, the tire pressure management system (hereinafter, referred to as "TPMS") may include tire pressure sensors (TPSs) 110 attached to respective tires, a TPMS electronic control unit (ECU) receiver 120, initiators 130 that correspond to the respective TPSs 110, and an instrument panel, (e.g., a cluster) 140. The TPS 110 attached to the tire may be configured to wirelessly transmit various pieces of tire-related information (e.g., a temperature, a pressure, an identification information, and an alarm flag) to the TPMS ECU receiver 120 cyclically or in response to a signal from the initiator 130. The initiator 130 may be included based on predetermined information such as specifications of vehicle models. Generally, the initiator 130 tends to be mounted within a high-class vehicle. When no initiator 130 is mounted within the vehicle, the TPS 110 may be configured to continuously transmit a wireless signal for a designated time. When the initiator 130 is mounted, a TPMS ECU may be configured to transmit an activation signal to the initiator 130 under a specific condition (e.g., during driving at 40 km/h or more) via wired communication (e.g., hard wiring).

The initiator 130 may be configured to transmit a wake-up signal to the TPS 110 in response to the signal. The TPS 110 may be configured to transmit tire information to the TPMS ECU in response to reception of the wake-up signal. In particular, the wake-up signal may be transmitted at a low frequency (e.g., about 125 kHz) and the tire information may be transmitted at a different radio frequency (e.g., about 433 MHz), but frequency bands thereof are not limited thereto. The TPMS ECU receiver 120 may be configured to receive transmitted tire information, which may be displayed on the cluster 140. When the tire information is displayed on the cluster 140, existence of an abnormality (e.g., underinflated tire) may be displayed using a warning light 141 or pressures and temperatures of wheels may be displayed using a graphic device 142, as shown in FIG. 1B.

When a hacker analyzes the structure of a packet (i.e., a sensor message), transmitted from the TPS, reconstructs information included in the packet, and then randomly transmits the packet to the receiver, the receiver may be configured to receive the packet and display information included in the packet on the cluster 140 or operate the warning light 141. Therefore, when the hacker continuously transmits a sensor message in a short cycle or transmits an incorrect value, a driver may perform a corrective action, such as stopping the vehicle, in response to the incorrect value or may be confused by an incorrect warning light. Therefore, to improve a TPMS wireless connection security, one exemplary embodiment of the present invention provides that 1) the TPMS may be configured to measure a time (i.e., delay) to receive a response after transmission of the wake-up signal through the initiator and then determine when to process packets received from the TPS in response to the time measured and 2) may be configured to set the minimum transmission rate of the TPS.

Figure 2:
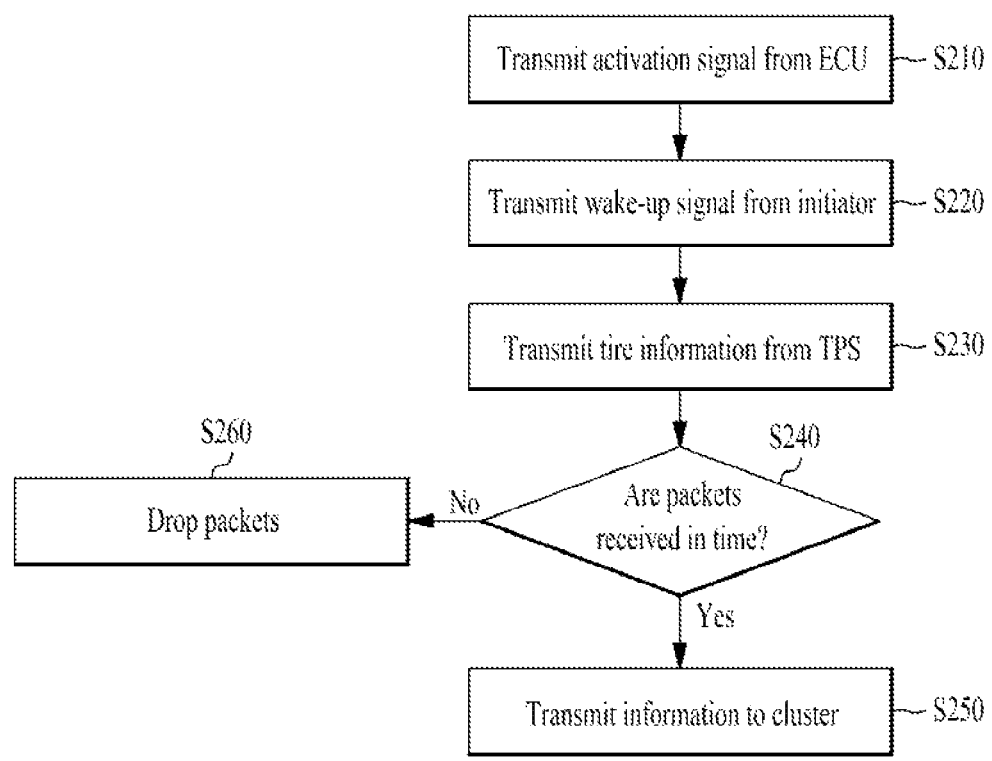
FIG. 2 is an exemplary flowchart illustrating a method of processing received packets according to one exemplary embodiment of the present invention.

FIG. 2 is an exemplary flowchart illustrating a method of processing received packets in response to a delay in accordance with one exemplary embodiment of the present invention. With reference to FIG. 2, the TPMS ECU may be configured to transmit an activation signal to the initiators (Operation S210). A transmission cycle may be randomly determined within a predetermined time range (e.g., about 60~90 seconds), which may make it more difficult to figure out the transmission cycle. For example, transmission of the activation signal may be performed at a time calculated by the following equation:

int sec;

for(;;){ srand(time(NULL));

sec=rand( )%31+60(s)}  Equation 1

Further, such a procedure may be performed when a predetermined condition is met (e.g., when the driving velocity of the vehicle is at least a specific velocity). The initiators, which may have received the activation signal from the TPMS ECU via wired communications, may be configured to transmit a wake-up signal to the TPSs 110 wirelessly (e.g., at a low frequency of about 125 kHz)

(S220). When the TPSs 110 have received the wake-up signal and collected tire information, the TPS 110 may be configured to transmit packets including TPS messages to the TPMS ECU receiver 120 wirelessly (e.g., at a radio frequency of 433 MHz) (S230).

When the TPMS ECU has received packets through the receiver, the TPMS ECU may be configured to calculate a final delay during an overall transmission/reception process (S240), and may also be configured to process TPS messages of packets within a predetermined allowable error range. Further, the TPMS ECU may be configured to transmit corresponding information to the cluster (S250). Alternatively, packets exceeding the allowable range may be discarded (e.g., dropped) (S260). The above-described final delay may be determined by the following equation:

$$d_{total} = d_{TPMS\_ECU \rightarrow Initiator} + d_{Initiator \rightarrow TPS} + d_{TPS\_process} + d_{TPS \rightarrow TPMS\_ECU} \quad \text{Equation 2}$$

wherein, $d_{total}$ means the final delay, $d_{TPMS\_ECU \rightarrow Initiator}$ means an activation signal transmission time, $d_{Initiator \rightarrow TPS}$ means a wake-up signal transmission time, $d_{TPS\_process}$ means a sensor processing (tire information sensing and message generation) time, and $d_{TPS \rightarrow TPMS\_ECU}$ means a packet transmission time. Of course, the calculation method of Equation 2 is exemplary and may thus be changed according to circumstances.

According to one exemplary embodiment of the present invention, an inner timer function may be added to the TPMS ECU, the reception cycle of packets received from the TPSs may be monitored, and, when packets are received in a predetermined effective packet reception cycle or less, the ECU may drop the corresponding packets. For example, when the effective packet reception cycle is set to about 30 seconds, when one packet is continuously received about every 10 seconds, the TPMS ECU may be configured to pass the first signal and drop the two subsequent packets received within the effective packet reception cycle. By setting the minimum packet transmission rate, a driver may be protected from a random short cycle message attack and transmitting the attack to the TPMS ECU receiver.

Figure 3:
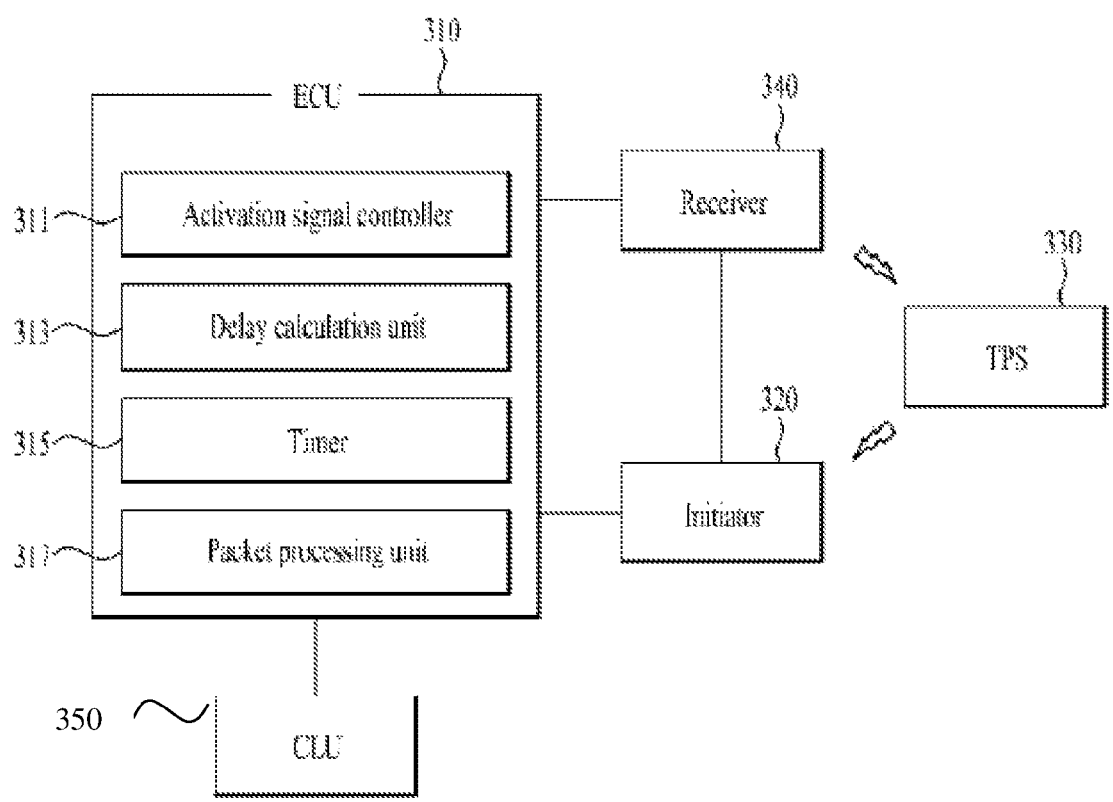
FIG. 3 is an exemplary block diagram illustrating a TPMS structure in accordance with one exemplary embodiment of the present invention.

Further, a TPMS structure which may perform the above-described operation will be described with reference to FIG. 3. FIG. 3 is an exemplary block diagram illustrating a TPMS structure in accordance with one exemplary embodiment of the present invention. With reference to FIG. 3, a TPMS may include an ECU 310, initiators 320, TPSs 330, a TMPS ECU receiver 340, and a cluster 350. The ECU may be configured to operate a plurality of units. The plurality of units may include an activation signal controller 311, a delay calculation unit 313, a timer 315, and a packet processing unit 317. In particular, the activation signal controller 311 may be configured to transmit an activation signal to the initiators 320, connected to the ECU 310 by hard wiring, within a random cycle. The delay calculation unit 313 may be configured to count a delay after transmission of the activation signal until packets from the TPSs 330 are received via the receiver 340. Further, the timer 315 may be configured to count an effective packet reception cycle using a timer 315. Furthermore, a packet processing unit 317 may be configured to transmit received packets to the cluster 350 or drop the packets based on the delay and the packet reception cycle.

At least one of the elements forming the ECU 310 may be physically implemented through one module, or two or more of the elements may be implemented through one module. In other words, the respective elements do not need to be physically separated from one another and may be implemented by a software algorithm. Further, the initiator and the TPS may be disposed on respective wheels of a vehicle or disposed on specific wheels. In other words, the number of initiators and TPSs may be equal to or less than the number of the wheels of the vehicle.

The above-described TPMS in accordance with an exemplary embodiment of the present invention may be configured to transmit a wake-up signal in a random cycle within a predetermined range and may be configured to process TPS messages received within a predetermined allowable error/cycle ranges, which may be configured to prevent hacker invasion into an internal network of a vehicle. Further, when the effective packet reception cycle value is set within an internal logic of the TPMS ECU and a message may be transmitted in a short cycle may also prevent hacking.

Consequently, the exemplary TPMS in accordance with an exemplary embodiment of the present invention may improve software (S/W) security of a vehicle maker and also may increase driver safety. Furthermore, the TPMS may be implemented by adding/revising an ECU software algorithm as opposed to improving sensor performance or adding specific hardware. The ease of implementation may also minimize increased production costs to a manufacturer.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A tire pressure management system, comprising:
   a memory configured to store program instructions;
   a controller configured to execute the program instructions, the program instructions when executed configured to:
      transmit a tire information request signal to tire pressure sensors in response to a first signal;
      wirelessly transmit the first signal to a plurality of initiators under a specific driving condition;
      receive packets including the tire information from tire pressure sensors;
      measure a delay after transmission of the first signal until the packets are received; and
      transmit the tire information within the received packets to a cluster or drop the received packets based on the delay.

2. The tire pressure management system according to claim 1, wherein program instructions when executed are further configured to transmit the first signal to the initiators in a random cycle within a predetermined range.

3. The tire pressure management system according to claim 1, wherein the program instructions when executed are further configured to:
   transmit the tire information to the cluster when the delay is within a predetermined range; and
   drop the packets when the delay beyond the predetermined range.

4. The tire pressure management system according to claim 1, wherein the program instructions when executed are further configured to:
   count a predetermined cycle; and
   transmit the first received packet to the cluster and drop the remaining packets when a plurality of packets is received within the cycle.

5. The tire pressure management system according to claim 1, wherein the number of the initiators and the number of the tire pressure sensors each correspond to the number of wheels of a vehicle.

6. A method for controlling a tire pressure management system comprising:
    transmitting, by a controller, a first signal to a plurality of initiators under a specific driving condition;
    wirelessly transmitting, by the controller, a tire information request signal from the initiators to tire pressure sensors in response to the first signal;
    receiving, by the controller, packets including the tire information from the tire pressure sensors through a receiver;
    measuring, by the controller, a delay until the packets are received after transmission of the first signal; and
    transmitting, by the controller, the tire information within the received packets to a cluster or dropping the received packets based on the delay.

7. The method according to claim 6, wherein the transmitting the first signal further includes transmitting, by the controller, the first signal to the initiators in a random cycle within a predetermined range.

8. The method according to claim 6, wherein the transmitting the tire information to the cluster based on the delay further includes:
    transmitting, by the controller, the packets to the cluster when the delay is within a predetermined range; and
    dropping, by the controller, the packets when the delay exceeds the predetermined range.

9. The method according to claim 6, when a plurality of packets are received within a predetermined cycle the transmitting the tire information further comprises:
    counting, by a controller, the predetermined cycle;
    transmitting, by the controller, a first received packet to the cluster and dropping, by the controller, any remaining packets received within the cycle.

10. The method according to claim 6, wherein wirelessly transmitting the tire information request signal from the initiators to tire pressure sensors in response to the first signal, further includes:
    matching, by the controller, a number of the initiators and a number of the tire pressure sensors with a number of wheels of a vehicle.

11. A non-transitory computer readable medium containing program instructions executed by a controller, the computer readable medium comprising:
    program instructions that transmit a first signal to a plurality of initiators under a specific driving condition;
    program instructions that wirelessly transmit a tire information request signal from the initiators to tire pressure sensors in response to the first signal;
    program instructions that receive packets including the tire information from the tire pressure sensors through a receiver;
    program instructions that measure a delay after transmission of the first signal until the packets are received; and
    program instructions that transmit the tire information within the received packets to a cluster or drop the received packets based on the delay.

12. The non-transitory computer readable medium of claim 11, wherein the program instructions that transmit a first signal to initiators further includes program instructions that transmit the first signal to the initiators in a random cycle within a predetermined range.

13. The non-transitory computer readable medium of claim 11, wherein the program instructions that transmit the tire information based on the delay further includes:
    program instructions that transmit the packets to the cluster when the delay is within a predetermined range; and
    program instructions that drop the packets when the delay exceeds the predetermined range.

14. The non-transitory computer readable medium of claim 11, when a plurality of packets are received within a predetermined cycle, the program instructions that transmit the tire information further includes:
    program instructions that count the predetermined cycled; and
    program instructions that transmit a first received packet to the cluster and drop any remaining packets received within the predetermined cycle.

* * * * *